United States Patent
Wu et al.

[11] Patent Number: 6,160,847
[45] Date of Patent: Dec. 12, 2000

[54] DETECTION MECHANISM FOR VIDEO CHANNEL UNDERFLOW IN MPEG-2 VIDEO DECODING

[75] Inventors: Scarlett Wu, Hillsborough; Arvind Patwardhan, San Jose, both of Calif.; Youichi Obana, Tokyo, Japan

[73] Assignee: LSI Logic Corporation, Milpitas, Calif.

[21] Appl. No.: 09/106,049

[22] Filed: Jun. 26, 1998

[51] Int. Cl.[7] .............................. H04N 7/12; H04N 11/02; H04N 11/04
[52] U.S. Cl. ......................................... 375/240.1; 348/419
[58] Field of Search .................................. 348/7–13, 390, 348/394, 412, 419; 382/233, 235; 375/240.01; H04N 7/12, 11/02, 11/04

[56] References Cited

U.S. PATENT DOCUMENTS

| | | | |
|---|---|---|---|
| 5,517,250 | 5/1996 | Hoogenboom et al. | 348/390 |
| 5,734,843 | 3/1998 | Gephardt et al. | 710/107 |
| 5,809,245 | 9/1998 | Zenda . | |
| 5,874,986 | 2/1999 | Gibbon et al. | 348/13 |
| 5,889,515 | 3/1999 | McDade et al. . | |
| 6,011,868 | 1/2000 | Van Den Branden et al. | 382/233 |
| 6,094,456 | 7/2000 | Ueda | 375/240 |

*Primary Examiner*—Howard Britton
*Assistant Examiner*—Nhon T Diep

[57] ABSTRACT

A method and system for displaying a series of video frames so that picture corruption from video channel underflows is avoided. The method comprises the steps of receiving a data stream with compressed video data for the series of video frames, storing the compressed video data in a channel buffer, processing a video frame if sufficient compressed video data for the video frame is stored in the channel buffer, and displaying a preceding video frame if insufficient compressed video data for the video frame is stored in the channel buffer. The system, which displays a series of video frames, also addresses the issue of video channel underflow. The video frames are received as compressed video data in a data stream that also includes size parameters, such as the vbv_delay parameter in the frame headers of MPEG frames, for each video frame in the series of video frames. The system comprises an input for receiving a data stream, a channel buffer for storing the compressed video data, a decoder that decodes the compressed video data and provides the decoded video data to a display device, and an underflow detector that compares the amount of compressed video data in the channel buffer to the required amount of compressed video data. If the amount of compressed video data in the channel buffer is less than the required amount, the decoder to pause before decoding the frame until a sufficient amount of compressed video data is available.

18 Claims, 2 Drawing Sheets

DETECTION MECHANISM FOR VIDEO CHANNEL UNDERFLOW IN MPEG-2 VIDEO DECODING

BACKGROUND OF THE INVENTION

1. Field of the Invention

This invention generally relates to the field of digital video decoding, and more particularly to a digital video decoder with a capability for recognizing and addressing a video channel underflow.

2. Description of the Related Art

Full-motion digital video requires a large amount of storage and data transfer bandwidth. Thus, video systems use various types of video compression algorithms to reduce the amount of necessary storage and transfer bandwidth. In general, different video compression methods exist for still graphic images and for full-motion video. Intraframe compression methods are used to compress data within a still image or single frame using spatial redundancies within the frame. Interframe compression methods are used to compress multiple frames, i.e., motion video, using the temporal redundancy between the frames. Interframe compression methods are used exclusively for motion video, either alone or in conjunction with intraframe compression methods.

Intraframe or still image compression techniques generally use frequency domain techniques, such as the discrete cosine transform (DCT). Intraframe compression typically uses the frequency characteristics of a picture frame to efficiently encode a frame and remove spatial redundancy. Examples of video data compression for still graphic images are JPEG (Joint Photographic Experts Group) compression and RLE (run-length encoding). JPEG compression is a group of related standards that use the discrete cosine transform (DCT) to provide either lossless (no image quality degradation) or lossy (imperceptible to severe degradation) compression. Although JPEG compression was originally designed for the compression of still images rather than video, JPEG compression is used in some motion video applications. The RLE compression method operates by testing for duplicated pixels in a single line of the bit map and storing the number of consecutive duplicate pixels rather than the data for the pixels themselves.

In contrast to compression algorithms for still images, most video compression algorithms are designed to compress full motion video. As mentioned above, video compression algorithms for motion video use a concept referred to as interframe compression to remove temporal redundancies between frames. Interframe compression involves storing only the differences between successive frames in the data file. Interframe compression stores the entire image of a key frame or reference frame, generally in a moderately compressed format. Successive frames are compared with the key frame, and only the differences between the key frame and the successive frames are stored. Periodically, such as when new scenes are displayed, new key frames are stored, and subsequent comparisons begin from this new reference point. It is noted that the interframe compression ratio may be kept constant while varying the video quality. Alternatively, interframe compression ratios may be content-dependent, i.e. if the video clip being compressed includes many abrupt scene transitions from one image to another, the compression is less efficient. Examples of video compression which use an interframe compression technique are MPEG, DVI and Indeo, among others.

MPEG Background

A compression standard referred to as MPEG (Moving Pictures Experts Group) compression is a set of methods for compression and decompression of full motion video images which uses the interframe and intraframe compression techniques described above. MPEG compression uses both motion compensation and discrete cosine transform (DCT) processes, among others, and can yield very high compression ratios.

The two predominant MPEG standards are referred to as MPEG-1 and MPEG-2. The MPEG-1 standard generally concerns inter-field data reduction using block-based motion compensation prediction (MCP), which generally uses temporal differential pulse code modulation (DPCM). The MPEG-2 standard is similar to the MPEG-1 standard, but includes extensions to cover a wider range of applications, including interlaced digital video such as high definition television (HDTV).

Interframe compression methods such as MPEG are based on the fact that, in most video sequences, the background remains relatively stable while action takes place in the foreground. The background may move, but large portions of successive frames in a video sequence are redundant. MPEG compression uses this inherent redundancy to encode or compress frames in the sequence.

An MPEG stream includes three types of pictures, referred to as the Intra (I) frame, the Predicted (P) frame, and the Bi-directional Interpolated (B) frame. The I (intra) frames contain the video data for the entire frame of video and are typically placed every 10 to 15 frames. Intraframes provide entry points into the file for random access, and are generally only moderately compressed. Predicted frames are encoded with reference to a past frame, i.e., a prior Intraframe or Predicted frame. Thus P frames only include changes relative to prior I or P frames. In general, P frames receive a fairly high amount of compression and are used as references for future P frames. Thus, both I and P frames are used as references for subsequent frames. Bi-directional pictures include the greatest amount of compression and require both a past and a future reference in order to be encoded. Bi-directional frames are never used as references for order frames.

In general, for the frame(s) following a reference frame, i.e., P and B frames that follow a reference I or P frame, only small portions of these frames are different from the corresponding portions of the respective reference frame. Thus, for these frames, only the differences are captured, compressed and stored. The differences between these frames are typically generated using motion vector estimation logic, as discussed below.

When an MPEG encoder receives a video file or bitstream, the MPEG encoder generally first creates the I frames. The MPEG encoder may compress the I frame using an intraframe lossless compression technique. After the I frames have been created, the MPEG encoder divides respective frames into a grid of 16×16 pixel squares called macroblocks. The respective frames are divided into macroblocks in order to perform motion estimation/compensation. Thus, for a respective target picture or frame, i.e., a frame being encoded, the encoder searches for a best fit or best match between the target picture macroblock and a block in a neighboring picture, referred to as a search frame. For a target P frame, the encoder searches in a prior I or P frame. For a target B frame, the encoder searches in a prior and subsequent I or P frame. When a best match is found, the encoder transmits a vector movement code or motion vector. The vector movement code or motion vector includes a pointer to the best fit search frame block as well as information on the difference between the best fit block and the respective target block. The blocks in target pictures that have no change relative to the block in the reference or search frame are ignored. Thus the amount of data that is actually stored for these frames is significantly reduced.

After motion vectors have been generated, the encoder then encodes the changes using spatial redundancy. Thus, after finding the changes in location of the macroblocks, the MPEG algorithm further calculates and encodes the difference between corresponding macroblocks. Encoding the difference is accomplished through a math process referred to as the discrete cosine transform or DCT. This process divides the macroblock into four sub-blocks, seeking out changes in color and brightness. Human perception is more sensitive to brightness changes than color changes. Thus the MPEG algorithm devotes more effort to reducing color space rather than brightness.

Therefore, MPEG compression is based on two types of redundancies in video sequences, these being spatial, which is the redundancy in an individual frame, and temporal, which is the redundancy between consecutive frames. Spatial compression is achieved by considering the frequency characteristics of a picture frame. Each frame is divided into non-overlapping blocks and respective sub-blocks, and each block is transformed via the discrete cosine transform (DCT).

After the transformed blocks are converted to the "DCT domain", each entry in the transformed block is quantized with respect to a set of quantization tables. The quantization step for each entry can vary, taking into account the sensitivity of the human visual system (HVS) to the frequency. Since the HVS is more sensitive to low frequencies, most of the high frequency entries are quantized to zero. In this step where the entries are quantized, information is lost and errors are introduced to the reconstructed image. Zero run length encoding is used to transmit the quantized values. The statistical encoding of the expected runs of consecutive zeroed-valued coefficients corresponding to the higher-order coefficients accounts for considerable compression gain.

In order to cluster non-zero coefficients early in the series and to encode as many zero coefficients as possible following the last non-zero coefficient in the ordering, the coefficient sequence is often organized in a specified orientation termed zigzag ordering. Zigzag ordering concentrates the highest spatial frequencies at the end of the series. Once the zigzag ordering has been performed, the encoder performs "run-length coding" on the AC coefficients. This process reduces each 8 by 8 block of DCT coefficients to a number of events represented by a non-zero coefficient and the number of preceding zero coefficients. Because the high-frequency coefficients are more likely to be zero, run-length coding results in additional video compression.

The video encoder then performs variable-length coding (VLC) on the resulting data. VLC is a reversible procedure for coding data that assigns shorter code words to frequent events and longer code words to less frequent events, thereby achieving additional video compression. Huffman encoding is a particularly well-known form of VLC that reduces the number of bits necessary to represent a data set without losing any information.

The final compressed video data is then ready to be transmitted to a storage device or over a transmission medium for reception and decompression by a remotely located decoder. Because of the picture dependencies, i.e., the temporal compression, the order in which the frames are transmitted, stored, or retrieved, is not necessarily the display order, but rather an order required by the decoder to properly decode the pictures in the bitstream. For example, a typical series of frames, in display order, might be shown as follows:

$$I_0B_1B_2P_3B_4B_5P_6B_7B_8P_9B_{10}B_{11}I_{12}B_{13}B_{14}P_{15}B_{16}B_{17}P_{18}$$

The indices indicate the display order of the frames. By contrast, the bitstream order corresponding to the given display would be as follows:

$$I_0P_3B_1B_2P_6B_4B_5P_9B_7B_8I_{12}B_{10}B_{11}P_{15}B_{13}B_{14}P_{18}B_{16}B_{17}$$

Because a B frame depends on a subsequent I or P frame in display order, the I or P frame must be transmitted and decoded before the dependent B frame.

As discussed above, temporal compression makes use of the fact that most of the objects remain the same between consecutive picture frames, and the difference between objects or blocks in successive frames is their position in the frame as a result of motion (either due to object motion, camera motion or both). The key to this relative encoding is motion estimation. In general, motion estimation is an essential processing requirement in most video compression algorithms. In general, motion estimation is the task of identifying temporal redundancy between frames of the video sequence.

The video decoding process is generally the inverse of the video encoding process and is employed to reconstruct a motion picture sequence from a compressed and encoded bitstream. The data in the bitstream is decoded according to a syntax that is defined by the data compression algorithm. The decoder must first identify the beginning of a coded picture, identify the type of picture, then decode each individual macroblock within a particular picture.

When encoded video data is transferred to a video decoder, the encoded video data is received and stored in a rate or channel buffer. The data is then retrieved from the channel buffer by a decoder or reconstruction device for performing the decoding process. When the MPEG decoder receives the encoded stream, the MPEG decoder reverses the above operations. Thus the MPEG decoder performs inverse scanning to remove the zigzag ordering, inverse quantization to de-quantize the data, and the inverse DCT to convert the data from the frequency domain back to the pixel domain. The MPEG decoder also performs motion compensation using the transmitted motion vectors to re-create the temporally compressed frames.

When frames are received which are used as references for other frames, such as I or P frames, these frames are decoded and stored in memory. When a reconstructed frame is a reference or anchor frame, such as an I or a P frame, the reconstructed frame replaces the oldest stored anchor frame and is used as the new anchor for subsequent frames.

When a temporally compressed or encoded frame is received, such as a P or B frame, motion compensation is performed on the frame using the neighboring decoded I or P reference frames, also called anchor frames. The temporally compressed or encoded frame, referred to as a target frame, will include motion vectors which reference blocks in neighboring decoded I or P frames stored in the memory. The MPEG decoder examines the motion vector, determines the respective reference block in the reference frame, and accesses the reference block pointed to by the motion vector from the memory.

In order to reconstruct a B frame, the two related anchor frames or reference frames must be decoded and available in a memory, referred to as the picture buffer. This is necessary since the B frame was encoded relative to these two anchor frames. Thus the B frame must be interpolated or reconstructed using both anchor frames during the reconstruction process.

After all of the macroblocks have been processed by the decoder, the picture reconstruction is complete. The resultant coefficient data is then inverse quantized and operated on by an IDCT process to transform the macroblock data from the frequency domain to data in the time and space domain. As noted above, the frames may also need to be re-ordered before they are displayed in accordance with their display order instead of their coding order. After the frames are re-ordered, they may then be displayed on an appropriate display device.

As described above, as the encoded video data is decoded, the decoded data is stored into a picture store buffer. In some configurations, the channel and picture buffers are incorporated into a single integrated memory buffer. The decoded data is in the form of decompressed or decoded I, P or B frames. A display processor retrieves the picture data for display by an appropriate display device, such as a TV monitor or the like.

The memory is a major cost item in the production of video encoders, and generally memories with higher bandwidths cost more. Thus, it is desirable to reduce the memory bandwidth requirements of the encoder system as much as possible to either reduce the cost or allow for increased performance.

A particular challenge in the decoding of MPEG data concerns the synchronization of the displayed video frames with the source MPEG data stream. The displayed frames are typically displayed at a predetermined frame rate, such as 25, 30, or 60 frames per second. The source data stream is typically delivered to the decoder at an average data rate corresponding to the frame rate and temporarily stored, as described above, in the channel buffer prior to decoding. Under certain conditions, the decoder may exhaust the compressed data stored in the channel buffer. During such a video channel underflow, the decoder may be required to pause while further data are stored into the channel buffer. This pausing during a condition of video channel underflow may lead to undesirable display characteristics. For example, if the video data are immediately displayed on the display device after being decoded, the pause may result in having part of one frame being displayed simultaneously with part of a preceding frame for an unacceptable duration of time. This challenge may be addressed in some ways by using more memory. For example, the decoded video data may be stored in one or more large frame buffers, and a frame might be displayed only after it has been fully decoded into the frame buffer. Such solutions, however, require a significant additional expense in terms of memory storage.

Thus, it would be desirable to have a system or method for addressing data underflow conditions in the video channel buffer without an inordinate additional memory requirement.

SUMMARY OF THE INVENTION

Accordingly, there is provided herein a method for displaying a series of video frames so that picture corruption from video channel underflows is avoided. The method comprises the steps of receiving a data stream with compressed video data for the series of video frames, storing the compressed video data in a channel buffer, processing a video frame if sufficient compressed video data for the video frame is stored in the channel buffer, and displaying a preceding video frame if insufficient compressed video data for the video frame is stored in the channel buffer.

Further described is a system for displaying a series of video frames that addresses the issue of video channel underflow. The video frames are received as compressed video data in a data stream that also includes size parameters, such as the vbv_delay parameter in the frame headers of MPEG frames, for each video frame in the series of video frames. The system comprises an input for receiving a data stream, a channel buffer for storing the compressed video data, a decoder that decodes the compressed video data and provides the decoded video data to a display device, and an underflow detector that compares the amount of compressed video data in the channel buffer to the required amount of compressed video data. If the amount of compressed video data in the channel buffer is less than the required amount of compressed video data, the underflow detector generates an underflow error signal that causes the decoder to pause before decoding the frame until a sufficient amount of compressed video data is available for the video frame.

BRIEF DESCRIPTION OF THE DRAWINGS

Other objects and advantages of the invention will become apparent upon reading the following detailed description and upon reference to the accompanying drawings in which.

Figure 1:
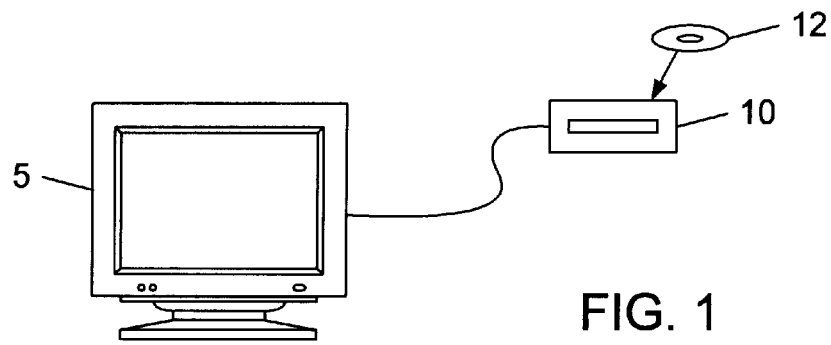
FIG. 1 shows an exemplary system for displaying digital video stored on a disk.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

The present invention comprises a system and method for displaying digital video while avoiding picture corruption from video channel underflows when displaying digital video. The invention is applicable to a wide variety of situations in which a stream of compressed video data is decoded and displayed, such as in DVD players and satellite TV receivers.

Figure 2:
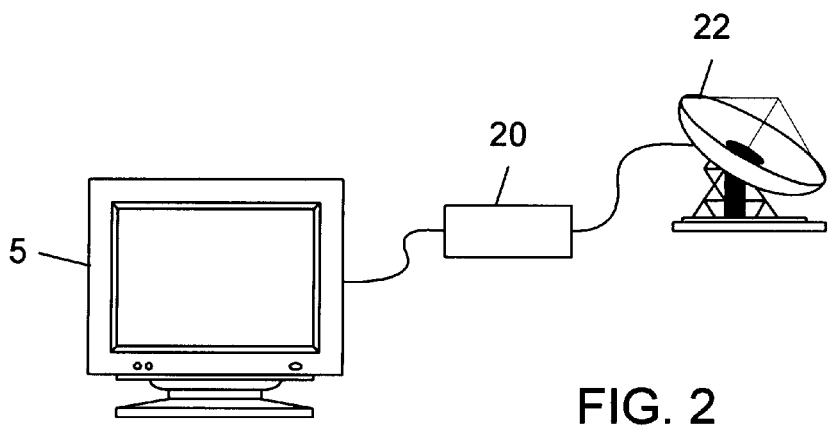
FIG. 2 shows an exemplary system for displaying digital video received from a satellite TV signal.

FIG. 1 and FIG. 2: System for Displaying Compressed Digital Video

FIG. 1 shows an embodiment of a system for displaying a series of video frames encoded in a data stream of compressed video data. In this embodiment, the system comprises a video decoding unit such as a DVD (Digital Versatile Disk) player 10 coupled to a display device 5. DVD player 10 is a video decoding unit configured to read MPEG2 compressed video data from a DVD disk 12, decode a series of video frames from the compressed video data, and provide the frames in a video output signal to display device 5. The video output signal is preferably a standard format video signal, such as an NTSC signal or a PAL signal. Display device 5 then displays the frames received in the video output signal from DVD player 5.

In this embodiment, DVD player 10 reads the compressed video data from DVD disk 12 at a predetermined frame rate, such as 25, 30, or 60 frames per second. DVD player 10 is configured to anticipate a data channel underflow, as described below, so that if necessary it may appropriately delay the decoding of a frame until sufficient data is available to complete the decoding of the entire frame. The effect of this delay is to temporarily pause the series of frames with a preceding complete frame displayed on display device 5 during the pause. When the channel underflow condition has been resolved, the sequential display of frames is resumed.

In other embodiments, display device 5 is coupled to video decoding units that receive compressed video data from other sources such as other optical disk players, satellite TV receivers, digital tape players, digital cable systems, among others. For example, as shown in FIG. 2, the video decoding unit may be a digital satellite decoder 20 that receives a data stream from a satellite TV receiver 22 and provides the decoded video frames to display device 5.

In one embodiment, display device 5 is preferably a TV display or other video monitor. In another embodiment of the invention, display device 5 is a recording device, such as a video tape recorder or an optical disk recorder, that records an analog signal, such as an NTSC signal or PAL signal, or a compressed or uncompressed digital signal. In yet another embodiment of the invention, display device 5 is a transmitting device, such as an RF transmitter or a cable transmission system. Display device 5 may also be a computer system that displays or stores frames in the video output signal.

Figure 3:
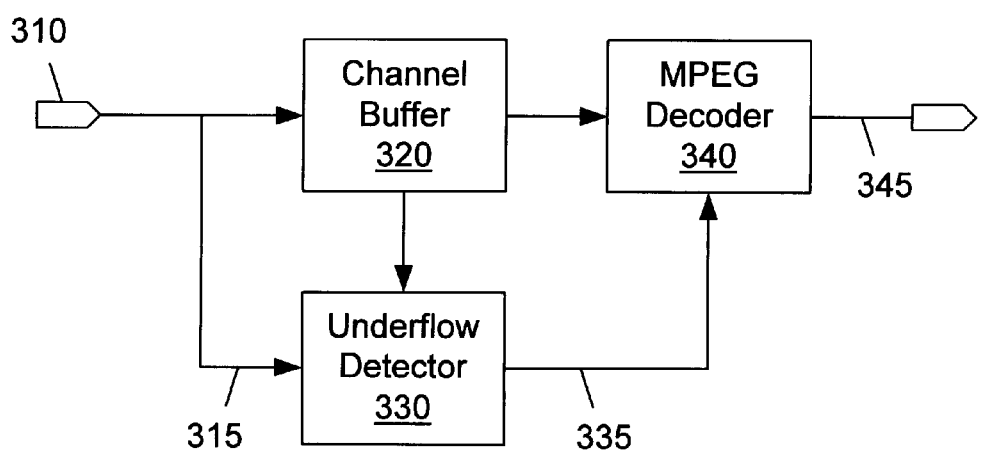
FIG. 3 is a block diagram of a system for avoiding picture corruption from video channel underflows.

FIG. 3: Block Diagram of a System for Avoiding Picture Corruption From Video Channel Underflows In one embodiment, the video decoding unit comprises elements as shown in the block diagram of FIG. 3. These elements include an input 310, a channel buffer 320 coupled to input 310, a decoder 340 coupled to channel buffer 320, and an underflow detector 330 coupled to input 310, to channel buffer 320, and to decoder 340.

Input 310 receives a digital data stream 315 that includes compressed video data. The digital data stream is provided to the input from a source such as DVD disk 12 or satellite TV receiver 22 described above, or from another such source of compressed video data. The compressed video data are formatted in a series of video frames, each of which is compressed for efficient storage and rapid transfer. Data stream 315 also includes a size parameter for each video frame. Each size parameter indicates how much compressed video data is used for its associated frame.

Channel buffer 320 receives the compressed video data from input 310 and holds the compressed video data until they are received by decoder 340. Decoder 340 decodes the compressed video data from the channel buffer to generate decoded video data that are provided to display device 5.

To anticipate video channel underflow for a particular video frame, underflow detector 330 receives the size parameter from input 310 for the video frame and monitors the amount of compressed video data stored in channel buffer 320. Underflow detector 330 is configured to determine the amount of compressed video data required for decoding the video frame from its size parameter. By comparing these two amounts underflow detector 330 detects the occurrence of a video channel underflow condition: if the amount of compressed video data stored in channel buffer 320 is less than the required amount of compressed video data when decoder 340 is ready to start decoding the frame, then underflow detector 330 generates an underflow error signal 335. Underflow error signal 335 is provided to decoder 340, which then delays the start of decoding the frame until a sufficient amount of additional data is received in channel buffer 320 and the video channel underflow condition is resolved.

In one embodiment, the compressed video data are MPEG formatted data, decoder 340 is an MPEG decoder, and the size parameters are "vbv_delay" values received in headers of the MPEG frames. The vbv_delay values, specified in the MPEG-1 _and MPEG-2 _standards, indicate the sizes of the MPEG frames.

Most MPEG encoders construct their output data streams in a manner that ensures a MPEG decoder can read the stream at a constant even pace without ever running out of or accumulating too much data for channel buffer 320. The MPEG encoders typically consider factors such as the varying sizes of encoded pictures. Ratios of 15:5:2 are common for I, P, and B frames. These different frame sizes result in varying download times for the frames: I frames may typically take 4 picture periods to download, while B frames take an average of half a picture period. Most MPEG encoders consider these factors in determining the different frames in a sequence.

In addition, the header for each frame specifies the vbv_delay value (vbv stands for "video buffering verifier"), which is a number that indicates to the MPEG decoder how long to wait for data to accumulate in channel buffer 12 before starting to decode the picture. Without the delay, the decoder may use all the available data before the entire frame is received in channel buffer 12.

The vbv_delay values are generated by the MPEG encoder at the time the video frames are encoded into the MPEG compressed format. The first vbv_delay value in a sequence of frames is arbitrary, but is typically kept large. Thereafter, a vbv_delay value is directly related to (1) the coded size of the corresponding frame and (2) the display duration of a preceding frame being displayed while the current frame is being decoded.

The combination of a constant frame rate and bitrate for the data stream (as specified in a sequence header that applies to a number of consecutive frames) and the vbv_delay provides, to an extent, that all the data for the picture is available in channel buffer 12 by the time it is needed. Nonetheless, a video channel underflow may occur under some conditions, such as if an error in the device that creates data stream 315 causes a temporary delay in the data stream. In this embodiment, underflow detector 330 determines the required amount of compressed video data for a frame from its vbv_delay and generates the underflow error signal upon detecting a channel underflow condition, as described above. The MPEG decoder then pauses before decoding the frame in response to the underflow error signal.

Figure 4:
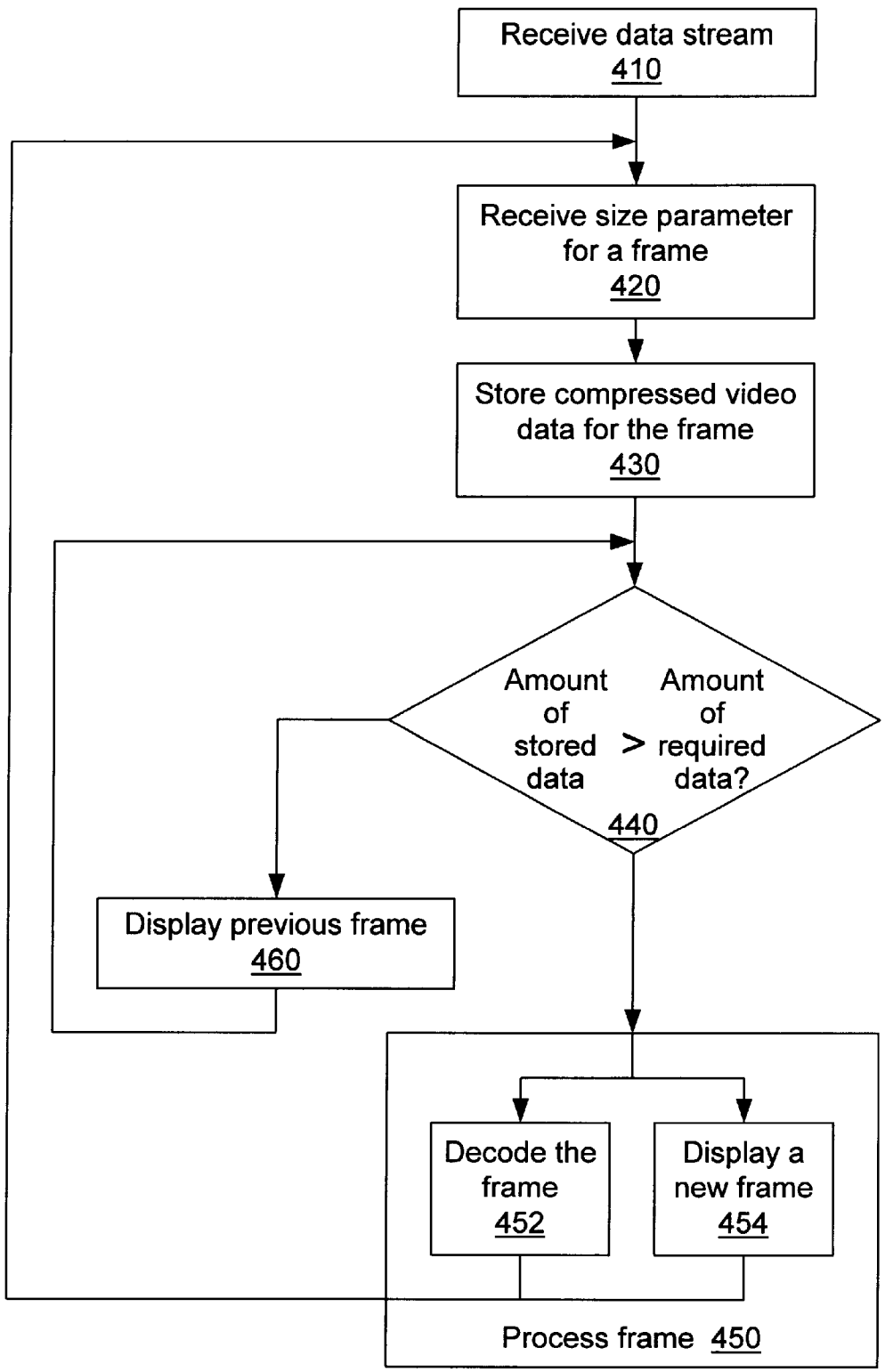
FIG. 4 is a flowchart of a method for avoiding picture corruption from video channel underflows.

FIG. 4: Flowchart of a Method for Avoiding Picture Corruption From Video Channel Underflows FIG. 4 outlines one embodiment of a method for displaying a series of video frames that avoids picture corruption from video channel underflows. In step 410 a data stream with compressed video data and size parameter for a series of video frames is received. The size parameter for a frame is received in step 420 and the compressed video data for the frame are stored in a channel buffer in step 430.

In step 440, the amount of the video frame's compressed video data stored in the channel buffer is compared to the required amount of compressed video data for the video frame. The required amount of compressed video data for the video frame is indicated by the size parameter for the video frame received in step 420.

If the required amount of compressed video data is available in the channel buffer, then the video frame is processed in step 450. Processing the video frame comprises step 452 of decoding the compressed video data for the video frame. Step 452 preferably also includes storing the decoded video frame in a video memory and removing the compressed video data for the video frame from the channel buffer. Processing the video frame also comprises step 454 of displaying a new video frame. The new video frame is a frame whose display order comes next in the sequence of frames. Thus, the new video frame may be the video frame most recently decoded in step 452, for example if that frame is a B frame or an I frame. Alternatively, the new frame may be a previously stored frame, for example a P frame.

If insufficient compressed video data for the video frame are stored in the channel buffer, a preceding video frame is displayed in step 460 until sufficient compressed video data are available. This method avoids a condition in which only part of the video frame is displayed for lack of the remaining compressed video information in the channel buffer. Steps 420–460 are repeated for subsequent video frames in the data stream.

What is claimed is:

1. A method for displaying a series of video frames, the method comprising:

(a) receiving a data stream, wherein the video data stream includes compressed video data for the series of video frames;

(b) storing the compressed video data in a channel buffer;

(c) processing a video frame if sufficient compressed video data for the video frame is stored in the channel buffer, wherein said processing the video frame comprises:
  decoding the compressed video data for the video frame; and
  displaying a new video frame;

(d) displaying a preceding video frame if insufficient compressed video data for the video frame is stored in the channel buffer.

2. The method of claim 1, wherein said processing the video frame further comprises removing the compressed video data for the video frame from the channel buffer after said decoding the compressed video data for the video frame.

3. The method of claim 1, further comprising:

(e) repeating steps (c) and (d) for each video frame in the series of video frames.

4. The method of claim 1, wherein the data stream is received from a ground-based broadcast TV signal, from a satellite TV signal, or from a cable TV signal.

5. The method of claim 1, wherein the data stream is received from a video storage medium.

6. The method of claim 5, wherein the video storage medium is a DVD, or a video disk, or a video tape.

7. The method of claim 1, wherein the data stream further includes size parameters for each video frame in the series of video frames, the method further comprising:
  receiving a size parameter for the video frame prior to said processing the video frame; and
  comparing an amount of the compressed video data for the video frame stored in the channel buffer to a required amount of compressed video data for the video frame, wherein the required amount of compressed video data for the video frame is indicated by the size parameter for the video frame;
  wherein said comparing indicates that sufficient compressed video data for the video frame is stored in the channel buffer if the amount of the compressed video data for the video frame stored in the channel buffer is greater than the required amount of compressed video data for the video frame;
  wherein said comparing indicates that insufficient compressed video data for the video frame is stored in the channel buffer if the amount of the compressed video data for the video frame stored in the channel buffer is less than the required amount of compressed video data for the video frame;
  wherein said processing a video frame is performed in response to said comparing if said comparing indicates that sufficient compressed video data for the video frame is stored in the channel buffer;
  wherein said displaying the preceding video frame is performed in response to said comparing if said comparing indicates that insufficient compressed video data for the video frame is stored in the channel buffer.

8. The method of claim 7, wherein said receiving the data stream comprises receiving MPEG video data.

9. The method of claim 7, wherein said receiving the data stream comprises receiving MPEG-2 video data.

10. The method of claim 8 or of claim 9, wherein said receiving the size parameter for the video frame comprises receiving a vbv_delay value for the video frame, wherein the required amount of compressed video data for the video frame is indicated by the vbv_delay value for the video frame.

11. A system for displaying a series of video frames, the system comprising:
  an input for receiving a data stream that includes size parameters and compressed video data for each video frame in the series of video frames;
  a channel buffer coupled to said input, wherein said channel buffer is operable to store the compressed video data;
  a decoder coupled to said channel buffer, wherein said decoder is operable to decode the compressed video data stored in said channel buffer, and wherein said decoder is operable to provide decoded video data to a display device; and
  an underflow detector coupled to said input, to said channel buffer, and to said decoder, wherein said underflow detector is operable to receive a size parameter for a video frame in the series of video frames from said input, wherein said underflow detector is operable to determine a required amount of compressed video data for the video frame from the size parameter, and wherein said underflow detector is operable to monitor an amount of compressed video data in said channel buffer;
  wherein said underflow detector compares the amount of compressed video data in said channel buffer to the required amount of compressed video data, wherein said underflow detector generates an underflow error signal if the amount of compressed video data in said channel buffer is less than the required amount of compressed video data; and
  wherein said decoder receives the error signal from said underflow detector, and wherein said decoder is operable to pause decoding of the compressed video data in response to the underflow error signal.

12. The system of claim 11, wherein the compressed data are removed from said channel buffer after being decoded by said decoder.

13. The system of claim 11, wherein the data stream is received from a ground-based broadcast TV signal, from a satellite TV signal, or from a cable TV signal.

14. The system of claim 11, wherein the data stream is received from a video storage medium.

15. The system of claim 14, wherein the video storage medium is a DVD, or a video disk, or a video tape.

16. The method of claim 11, wherein the compressed video data are MPEG video data.

17. The method of claim 11, wherein the compressed video data are MPEG-2 video data.

18. The method of claim 16 or of claim 17, wherein the size parameter for the video frame is a vbv_delay value for the video frame, wherein the required amount of compressed video data for the video frame is indicated by the vbv_delay value for the video frame.

* * * * *